No. 735,133. PATENTED AUG. 4, 1903.
E. L. McKINNON.
CHEESE PRESS.
APPLICATION FILED AUG. 23, 1902.
NO MODEL.
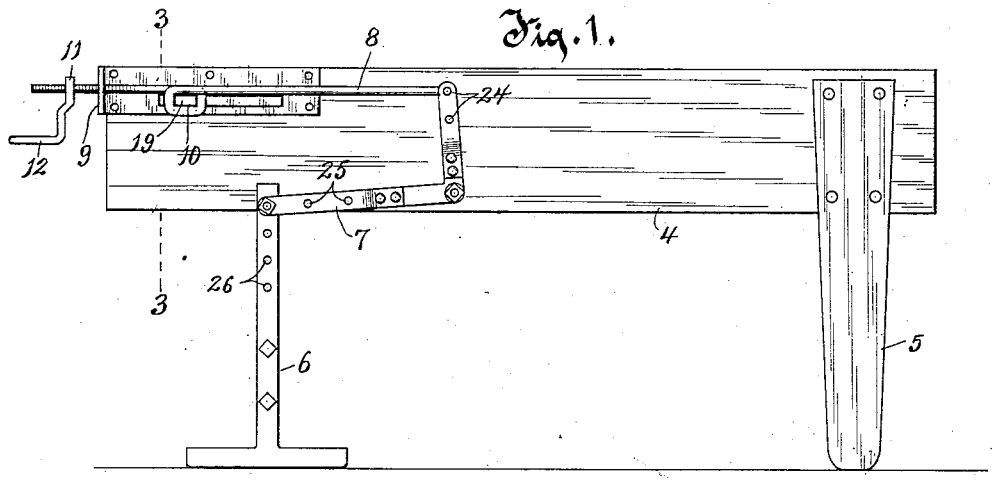
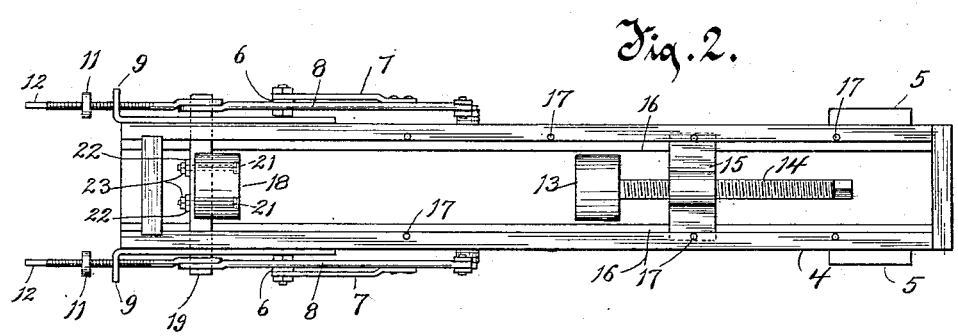
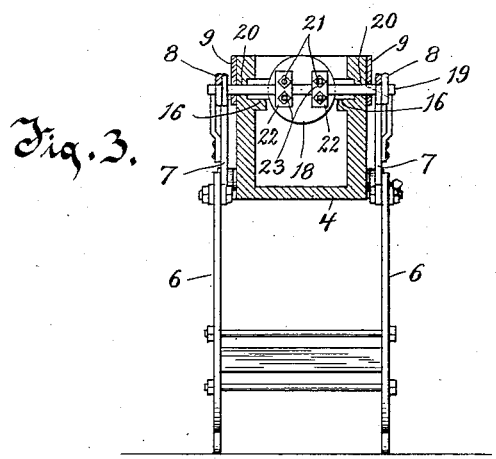
Witnesses.
C. H. Keeney,
Anna O. Faust.
Inventor.
Elmer L. McKinnon
By Benedict, Morsell & Green.
Attorneys.
THE NORRIS PETERS CO., PHOTO-LITHO., WASHINGTON, D. C.

No. 735,133. Patented August 4, 1903.

UNITED STATES PATENT OFFICE.

ELMER L. McKINNON, OF SHEBOYGAN FALLS, WISCONSIN.

CHEESE-PRESS.

SPECIFICATION forming part of Letters Patent No. 735,133, dated August 4, 1903.

Application filed August 23, 1902. Serial No. 120,744. (No model.)

*To all whom it may concern:*

Be it known that I, ELMER L. MCKINNON, residing at Sheboygan Falls, in the county of Sheboygan and State of Wisconsin, have invented a new and useful Improvement in Attachments for Cheese-Presses, of which the following is a description, reference being had to the accompanying drawings, which are a part of this specification.

My invention has relation to improvements in attachments for cheese-presses.

In cheese-presses, unless provision is made to guard against it, the cheese, after being compressed between the presser-heads, will shrink, and thereby the pressure on the cheese is to that extent relaxed.

It is the primary object of my invention, therefore, to provide an improved construction for automatically continuing the pressure even after the shrinkage of the compressed cheese occurs.

A further object resides in the provision of means for adjusting the leverage whereby the extent of the automatic compression is regulated.

With the above and other incidental objects in view the invention consists of the devices and parts or their equivalents, as hereinafter set forth.

In the accompanying drawings, Figure 1 is a side elevation of an ordinary gang cheese-press equipped with my attachments. Fig. 2 is a plan view thereof, and Fig. 3 is a cross-section on the line 3 3 of Fig. 1.

Referring to the drawings, the numeral 4 indicates the box or receptacle of the cheese-press supported at one end by the fixed standards or legs 5. At its opposite end the box is adjustably supported, the adjustable support consisting of uprights or standards 6 6, bell-crank levers 7 7, pivoted to opposite sides of the box or receptacle and having their lower arms pivoted to the upper ends of the legs or standards 6, and the links 8 8, arranged on opposite sides of the box or receptacle and pivoted at their inner ends to the upper arms of the bell-crank levers. The outer ends of the links are threaded and pass through and are guided in openings in flanges 9 9, projecting laterally from the end of the box. Each link between its ends is provided with an elongated slot or loop 10, which is preferably formed by bending the metal of the link into loop shape at such points. The outer threaded ends of the links receive thereon nuts 11 11, which are advisably provided with handles 12 for convenience in turning.

My invention may be applied to any form of cheese-press, and in the accompanying drawings I have shown a cheese-press in which the box or receptacle is provided with an ordinary adjustable presser-head or follower 13, the adjustment being obtained by providing said follower with a projecting screw 14, which passes through a threaded opening in a transverse plate 15, the ends of said plate fitting in guideways 16 16, formed on the inner sides of the box or receptacle. The presser-head or follower is moved toward or from the opposite end of the box or receptacle by turning the screw in the proper direction and which may be conveniently done by applying a suitable turning implement or tool to the end of the screw. The transverse plate carrying the screw may be moved in its guideways to any desirable position and held in such position by passing pins through openings 17 in the top edges of the box or receptacle and causing said pins to engage openings in the ends of the transverse plate. The other presser-head is indicated by the numeral 18 and is carried on a transverse bar 19, which bar extends through elongated slots 20 in the sides of the box or receptacle, and the ends thereof are fitted in the elongated slots or loops 10 of the links. The said presser-head may be secured to this transverse bar in any desirable manner, but I prefer to secure the same thereto by slotting the outer face of the head and causing the said bar to engage the slot. Staples 21 are then passed through the head, and the legs of the staples straddle the bar, and the ends of the legs are connected by plates 22, nuts 23 being turned onto the threaded ends of the legs of the staples against said plates.

In the use of my invention the movable end of the box is first raised, and this has the effect of drawing the rods 8 outwardly, and consequently turning the bell-crank levers so that the upper arms thereof will be thrown outwardly, and hence the box or receptacle is thereby raised. After being thus raised the nuts 11 are turned inwardly against the flanges 9, which of course maintains the movable end of the box in its raised position. The cheese is now placed in the box or receptacle between the two presser-heads and the screw 14 is turned in the proper direction to advance the presser-head or follower 13 toward the opposed head 18, and consequently the cheese is compressed between the two heads. This turning of the screw 14 is continued until the proper degree of compression is reached, and during this direct compression of the cheese the movable end of the box or receptacle, through the described connection between the movable supports and the presser-head 18 and the turning of the nuts 11 against the flanges 9, is maintained in its raised position. Fig. 1 of the drawings shows the position of the box when the cheese has been compressed and before shrinkage of said cheese. After compression of the cheese care should be taken in every instance to turn the nuts outwardly a desired distance away from the flanges 9—say to the position shown in Fig. 1—as otherwise the end of the box, by contact of the nuts with said flanges, would be prevented from lowering, and thereby taking up shrinkage of the cheese. When the nuts are thus adjusted outwardly, when any shrinkage of the cheese occurs the movable end of the box necessarily lowers, inasmuch as pressure on the head is relaxed, and hence the transverse bar 19 is permitted to move toward the presser-head or follower 13, this movement being made possible by reason of the fact that said bar is connected at its ends to the links 8, and hence the bell-crank levers are turned in a direction opposite to that first explained, and the movable end of the box thereby lowered, the heft of the cheese and the heft of the machine being directed against the cheese. It follows from this that the head 18 moves toward the head 13 as the shrinkage occcurs, and hence a continuous pressure on the cheese is maintained, notwithstanding shrinkage of said cheese. The lowering of the movable end of the box under shrinkage of the cheese will continue until the nuts 11 contact with the flanges 9.

A very important feature of my invention is the provision of means for adjusting the leverage, whereby the extent of the automatic compression of the cheese under shrinkage of said cheese is regulated. This consists in providing the upper arms of the bell-crank levers with openings 24, with any of which the ends of the links 8 may be connected, and also providing the lower arms of the bell-crank levers with openings 25 and the upper arms of the legs 6 with openings 26. It is obvious that by connecting the links 8 to different openings of the upper arms of the bell-crank levers different leverages can be secured, or the same result can be obtained by connecting the lower arms of the bell-crank levers with the legs 6 at different points by passing pins through any of the openings which may be brought into registration.

It will be seen from the construction described that my attachments are of such character as to be capable of being readily attached to any ordinary form of cheese-press, it only being necessary to provide elongated openings in the sides of the box or receptacle through which the ends of the bar 19, carrying the presser-head 18, may pass (where a box or receptacle is employed) and then properly connecting the supports 6, levers 7, rods 8, flanges 9, and turning the nuts 11 on the rods 8.

A further advantage possessed by my invention to which attention is directed is the fact that by the construction adopted by me the pressure required to take up shrinkage on either large or small cheeses can be so regulated as to give said cheeses any desired amount of pressure, and after the direct compression is given to the cheese by the actuation of the presser-head 13 the machine requires no further attention, inasmuch as it will automatically take up the subsequent shrinkage in the cheese, as above stated.

While I have herein shown and described certain details of construction, yet I do not wish to be understood as limiting myself thereto, inasmuch as changes or variations in such specific details may be made without departing from the spirit and scope of my invention—as, for instance, the attachments need not necessarily be applied to a cheese-press having a box or receptacle for the cheese, but to any form of cheese-press in which the cheese to be compressed is supported in any desirable manner. In such construction, however, the elongated slots 20 would of course be omitted and the presser-head 18 supported in any other desirable manner, so as to be capable of limited longitudinal movement. I therefore do not wish to be understood by the use of the words "box or receptacle" in the description and claims as strictly limiting myself specifically to a box or receptacle.

What I claim as my invention is—

1. In cheese-press attachments, the combination of a box or receptacle, supporting-legs connected to one end thereof, a movable support for the opposite end of the box or receptacle, an adjustable presser-head or follower in the box, an opposed presser-head having a limited longitudinal movement, a connection between said presser-head and the movable support for the box to permit the movable end of the box to be initially raised prior to the compression of the cheese, and to also permit said movable end of the box to descend during the shrinkage of the cheese, and means for holding the movable end of the box or receptacle in its raised position during the direct compression of the cheese.

2. In cheese-press attachments, the combination of a box or receptacle, supporting-legs connected to one end of the box or receptacle, a movable support for the opposite end of said box or receptacle, an adjustable presser-head or follower within the box, a transverse bar movably supported in the box, a presser-head carried by said bar and opposed to the adjustable presser-head or follower, a connection between the transverse bar and the movable support of the box, to permit the movable end of the box to be raised prior to the direct compression of the cheese in the box, and also permit said movable end of the box to lower after the direct compression has ceased, and the cheese commences to shrink, and means for holding the movable end of the box or receptacle fixedly in its raised position during the direct compression of the cheese.

3. In cheese-press attachments, the combination of a box or receptacle, supporting-legs connected to one end of the box or receptacle, a movable support for the opposite end of the box or receptacle, an adjustable presser-head or follower within the box, a transverse bar movably supported in the box and having its ends projecting through elongated slots in opposite sides of said box, a presser-head carried by said bar and opposed to the adjustable presser-head or follower, a connection between the movable support for the box and the ends of the bar which project through the elongated slots, whereby the movable end of the box is permitted to be initially raised prior to the direct compression of the cheese in the box, and also permitting said movable end of the box to automatically lower after the direct compression has ceased and the cheese begins to shrink, and means for fixedly maintaining the movable end of the box in its raised position during the direct compression of the cheese.

4. In cheese-press attachments, the combination of a box or receptacle, supporting-legs connected to one end of said box or receptacle, a movable support for the opposite ends of the box or receptacle, an adjustable presser-head or follower within the box, a transverse bar having its ends projecting through elongated slots in the sides of the box, a presser-head carried by said bar and opposed to the presser-head or follower, links to which the projecting ends of the transverse bar are connected, a connection between the links and the movable support for the box, whereby the movable end of the box is permitted to be raised prior to the direct compression of the cheese in the box, and said movable end of the box also thereby permitted to automatically lower after the direct compression of the cheese, and when said cheese begins to shrink, and means for fixedly holding the movable end of the box in its raised position during the direct compression of the cheese.

5. In a cheese-press, the combination of a box or receptacle, an adjustable presser-head or follower therein, a transverse bar having its ends projecting through elongated slots in the sides of the box, a presser-head carried by said bar and opposed to the other presser-head or follower, supporting-legs connected to one end of the box, legs at the opposite end of said box, arms pivoted to opposite sides of the box, the lower arms being connected to the latter legs, and links connected to the projecting ends of the transverse bar and having their inner ends connected to the upper of the pivoted arms.

6. In a cheese-press, the combination of a box or receptacle, an adjustable presser-head or follower therein, a transverse bar having its ends projecting through elongated slots in the sides of the box, a presser-head carried by said bar and opposed to the other presser-head or follower, supporting-legs connected to one end of the box, legs at the opposite end of said box, arms pivoted to opposite sides of the box, an adjustable connection between the last-named legs and the lower arm, and links connected to the projecting ends of the transverse bar and having their inner ends connected to the upper of the pivoted arms.

7. In a cheese-press, the combination of a box or receptacle, an adjustable presser-head or follower therein, a transverse bar having its ends projecting through elongated slots in the sides of the box, a presser-head carried by said bar and opposed to the other presser-head or follower, supporting-legs connected to one end of the box, legs at the opposite end of said box, arms pivoted to opposite sides of the box, the lower arms being connected to the latter legs, links connected to the projecting ends of the transverse bar, and means for adjustably connecting the inner ends of said links to the upper of the pivoted arms.

8. In a cheese-press, the combination of a box or receptacle, an adjustable presser-head or follower therein, a transverse bar having its ends projecting through elongated slots in the sides of the box, a presser-head carried by said bar and opposed to the other presser-head or follower, legs connected to one end of the box, a movable support for the opposite end of the box to permit said end of the box to move upwardly or downwardly, links to which the projecting ends of the transverse bar are connected, the outer ends of said links being threaded, flanges projecting out laterally from the box, and provided with openings through which the links pass, nuts on the threaded ends of the links, and a connection between the links and the adjustable support.

9. In a cheese-press, the combination of a box or receptacle, an adjustable presser-head or follower therein, a transverse bar having its ends projecting through elongated slots in the sides of the box, a presser-head carried by said bar and opposed to the other presser-head or follower, supporting-legs connected to one end of the box, a movable support for the opposite end of the box to permit said end of the box to move upwardly or downwardly, links provided between their ends with slots or loops to receive the projecting ends of the transverse bar, and a connection between the links and the adjustable support.

10. In a cheese-press, the combination of a box or receptacle, an adjustable presser-head or follower therein, a transverse bar having its ends projecting through elongated slots in the sides of the box, a presser-head carried by said bar and opposed to the other presser-head or follower, legs connected to one end of the box, a movable support for the opposite end of the box to permit said end of the box to move upwardly or downwardly, links provided between their ends with slots or loops formed by bending the metal of the links into loop form, said slots or loops adapted to receive the projecting ends of the transverse bar and a connection between the links and the adjustable support.

In testimony whereof I affix my signature in presence of two witnesses.

ELMER L. McKINNON.

Witnesses:
   JNO. E. THOMAS,
   STEDMAN THOMAS.